Figure 1:
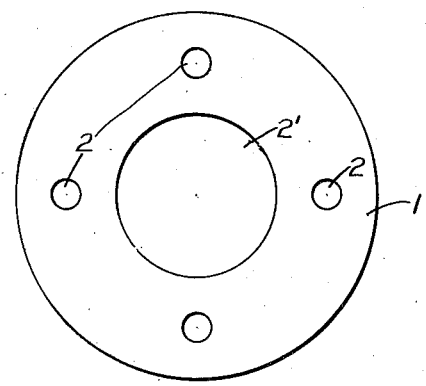

Aug. 12, 1924.　　　　　　　　　　　　　　　　1,504,626
J S. KINNEY
FLEXIBLE COUPLING
Filed July 22, 1918

WITNESSES:
H B Funk
O E Bee

INVENTOR
J Stanley Kinney.
BY
Wesley G Carr
ATTORNEY

Patented Aug. 12, 1924.

1,504,626

UNITED STATES PATENT OFFICE.

J STANLEY KINNEY, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE COUPLING.

Application filed July 22, 1918. Serial No. 245,989.

*To all whom it may concern:*

Be it known that I, J STANLEY KINNEY, a citizen of the United States, and a resident of Wilkinsburg, in the county of Allegheny and State of Pennsylvania, have invented a new and useful Improvement in Flexible Couplings, of which the following is a specification.

My invention relates to flexible couplings, and it has for its primary object the provision of flexible couplings employing flexible disks of impregnated fibrous material which, in their final state, are flexible, hard and not affected by changes in temperature, or by oil or moisture The various metallic universal joints which have been widely employed, although strong, are open to criticism on account of the careful lubrication required. Universal joints of metal must also be kept free from grit, as excessive wear will result when grit or dust accumulates in the joints. Furthermore, if the joints become slightly worn and the connections loose, the lubricant contained therein will be forced out by the action of centrifugal force. In order to overcome these objectionable features, I have constructed a coupling employing flexible disks of such a nature that lubrication is unnecessary.

Flexible joints employing resilient non-metallic disks have also been used but, to the best of my knowledge, it has been necessary to utilize washers carefully shaped to provide a very high frictional engagement with the resilient disks. This is objectionable, however, for the reason that, if the washers in any way become loosened, the disks will be subjected to excessive wear and deformation. In view of this, one object of my invention is to provide a flexible disk having such mechanical strength that knurled or friction washers may be dispensed with.

Another object of my invention is to provide a flexible coupling member having a very high tensile strength, which may be easily constructed of ordinary fibrous material impregnated with a suitable binder and subjected to heat and pressure.

A still further object of my invention is to provide a flexible disk for couplings which will be unaffected by oils, weak acids and alkalis.

With these and other objects in view, my invention will be more fully described, illustrated in the drawings, in the several views of which like numerals indicate corresponding parts, and then particularly pointed out in the claims.

Figure 2:
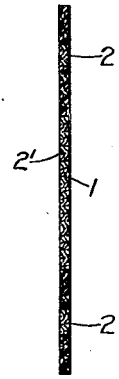
Figure 3:
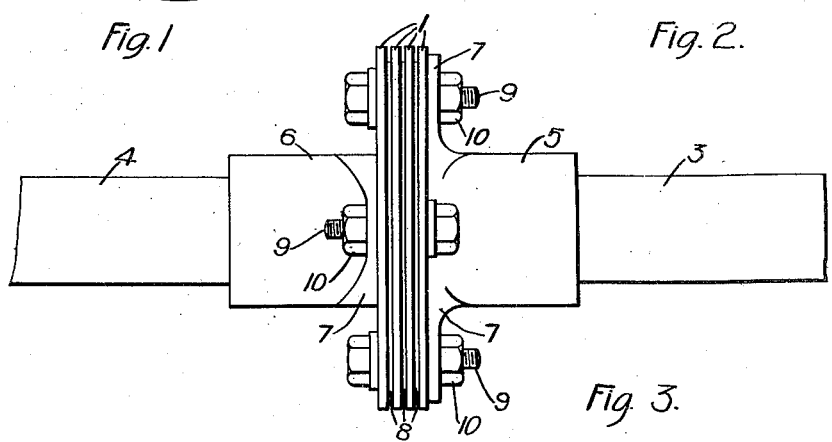
Figure 4:
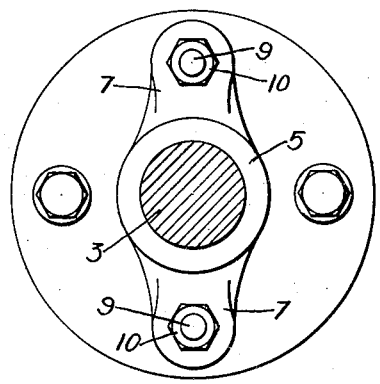

Referring to the drawings, Fig. 1 is a side elevation of a flexible disk embodying my invention; Fig. 2 is a diametral, sectional view of the disk shown in Fig. 1; Fig. 3 is a side elevation of a universal joint illustrating one application of my improved disk, and Fig. 4 is an end view of the universal joint shown in Fig. 3.

In practising my invention, I employ sheets of fibrous material impregnated with a suitable binder. The fibrous sheets may be impregnated by drawing them through a bath of a suitable adhesive after which they may be dried. The sheets may then be stacked to a predetermined thickness and subjected to heat and pressure to compact the material and harden the binder. The desired articles may then be punched from the pressed and hardened sheets by employing a die of suitable design. The articles may also be formed by punching correctly shaped pieces from the sheet material after which the punched pieces may be impregnated and stacked in layers to which heat and pressure may be applied.

In Fig 1 is shown a disk 1 having openings 2 suitable for receiving bolts which may be employed to clamp several of the disks together. The disk 1 may comprise layers of fibrous material, such as paper or duck, impregrated with a suitable binder, such as a phenolic condensation product. Duck is preferred on account of the superior binding action between layers that obtain when stacked layers of it, which have been impregnated with a binder, are subjected to heat and pressure and because of the resiliency which it imparts to the finished product. The removal of the material from the central portion of the disk 1 which provides the opening 2' increases the flexibility of the disk and does not reduce its strength.

In Fig. 3 is shown one application of my improved disk as employed in a universal joint. The separable sections 3 and 4 of the power-transmitting shaft have sleeves 5 and 6 rigidly mounted thereon which have laterally extending ears 7 between which flexible disks 1 may be secured to connect the separable sections 3 and 4 of the power-transmitting shaft and maintain them in spaced relation. Spacing disks 8, usually of metal, may be employed to separate the several flexible disks from each other. Bolts 9 and nuts 10 serve as a clamping means to hold the parts in close engagement. Since the ears 7 of sleeve 5 are located intermediate the ears 7 of the sleeve 6, the flexible members 1 secured between them are free to bend and allow angular movement of the separable sections 3 and 4 of the power-transmitting shaft. The number of disks employed in flexible couplings of this character is determined by the nature of the joint and the power to be transmitted. For instance, where the torque applied is relatively small, one comparatively thin disk may be employed, as the nature of the binder which is utilized in constructing my improved disks insures a mechanically strong and compact structure.

A coupling constructed in accordance with my invention is noiseless in operation and is easily repaired by replacing any worn parts. The bolts which pass through the disks need not fit in the openings, provided for them in the disks, with great accuracy as the material I employ will resist any stresses resulting from side thrusts which might occur from the loosely fitting bolts. Because of the great strength of the flexible disks, less material is required to insure efficient service than has been possible in couplings of this character previously constructed. The flexible members constructed in accordance with my invention possess self-lubricating qualities to a sufficient degree to eliminate excessive wear. Furthermore, the self-lubricating properties may be increased by mixing a small percentage of graphite with the adhesive before the fibrous material is impregnated.

Although I have described only a few methods by which my improved disk may be constructed and have illustrated but one application of it, it is obvious that minor changes may be made in the construction of flexible disks embodying my invention and that various applications of them may be employed. I desire, therefore, that no limitations shall be imposed except such as are indicated in the appended claims.

I claim as my invention:

1. In a flexible coupling, the combination with shaft sections carrying laterally extending ears at their adjacent ends, of flexible members secured to the ears of each shaft, with the ears of one shaft disposed intermediate those of the other, the flexible members comprising fibrous sheet material impregnated with a hardened phenolic condensation product.

2. In a flexible coupling, the combination with shaft sections carrying laterally extending ears at their adjacent ends, of flexible members secured to the ears of each shaft, with the ears of one shaft disposed intermediate those of the other, the flexible members comprising duck impregnated with a hardened phenolic condensation product.

3. In a flexible coupling, the combination with shaft sections carrying laterally extending ears at their adjacent ends, of flexible members secured to the ears of each shaft, with the ears of one shaft disposed intermediate those of the other, the flexible members comprising superimposed layers of duck impregnated with a hardened phenolic condensation product.

4. A flexible coupling member comprising fibrous sheet material impregnated with a hardened phenolic condensation product.

5. A flexible coupling member comprising superimposed layers of fibrous sheet material impregnated with a hardened phenolic condensation product.

6. A flexible coupling member comprising superimposed layers of duck impregnated with a hardened phenolic condensation product.

7. A flexible coupling member comprising superimposed layers of duck impregnated with a hardened phenolic condensation product containing graphite.

In testimony whereof, I have hereunto subscribed my name this 17th day of July 1918.

J STANLEY KINNEY.